(12) United States Patent  (10) Patent No.: US 6,217,108 B1
Sasaki  (45) Date of Patent: Apr. 17, 2001

(54) VEHICLE HOOD APPARATUS

(75) Inventor: Sakae Sasaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/611,249

(22) Filed: Jul. 7, 2000

(30) Foreign Application Priority Data

Jul. 9, 1999 (JP) .................................................. 11-196783

(51) Int. Cl.⁷ .................................................. B62D 25/12
(52) U.S. Cl. .......................... 296/194; 296/189; 180/274; 180/281
(58) Field of Search .................................. 296/194, 189; 180/274, 281, 271

(56) References Cited

U.S. PATENT DOCUMENTS

| 3,709,316 | 1/1973 | Glance | 296/194 X |
|---|---|---|---|
| 4,249,632 | * 2/1981 | Lucchini et al. | 180/274 |
| 4,572,314 | 2/1986 | Anguera . | |
| 4,753,475 | 6/1988 | Mochida | 180/69.21 X |

FOREIGN PATENT DOCUMENTS

| 9-315266 | 5/1996 | (JP) . |
|---|---|---|
| 10-258774 | 3/1997 | (JP) . |
| 11-34925 | 7/1997 | (JP) . |

OTHER PUBLICATIONS

Specification of Application No.: 09/610,187.
Specification of Application No.: 09/611,930.
Specification of Application No.: 09/613,125.
Specification of Application No.: 09/619,323.

* cited by examiner

Primary Examiner—Joseph D. Pape
(74) Attorney, Agent, or Firm—Merchant & Gould P.C.

(57) ABSTRACT

A vehicle hood apparatus comprises a hood-retaining mechanism for, upon collision of a vehicle with an obstacle, lifting a rear end of a hood and retaining the hood at the lifted position. The hood-retaining mechanism includes a flexible link comprised of a lower link with one end pivotally connected to a body frame and an upper link with one end pivotally connected to the hood. Opposite ends of the lower and upper links are rotatably connected with each other through a hinged portion. The hinged portion is arranged to be positioned offset from longitudinal central axes of the lower and upper links toward the back of the vehicle. The upper and lower links have stoppers formed integrally therewith. By virtue of these stoppers, when the hood is lifted a predetermined amount and the flexible link is extended to apply to the hinged portion an operational force directed toward the back of the vehicle, the hinged portion may not be moved further toward the back of the vehicle, thus preventing the flexible link from folding. As a result, the hood can be retained stably at its predetermined-amount-lifted position.

3 Claims, 15 Drawing Sheets

VEHICLE HOOD APPARATUS

BACKGROUND OF THE INVENTION

1. Field of the Invention:

This invention relates generally to a hinged hood apparatus for covering a front engine room of a vehicle and, more particularly, to a vehicle hood apparatus arranged such that when a vehicle employing the hood apparatus collided with an obstacle while running, it mitigates the collision impact applied to the obstacle.

2. Description of the Prior Art:

When an obstacle Is hit by a running vehicle, the obstacle is often hit first by a front bumper of the vehicle, flown up and then landed on the hood. At this time, the obstacle is imparted with an impact of collision with the hood.

For mitigating such a collision impact, a vehicle hood apparatus is proposed in Japanese Patent Laid-Open Publication No. HEI-9-315266. The proposed hood apparatus is arranged such that upon collision, a rear end of the hood is lifted to provide a gap between the hood and an engine compartment or room so that the hood can deform downward to thereby absorb collision energy. In the hood apparatus, the collision of the vehicle with the obstacle is detected by a collision sensor. Based on a collision signal output from the collision sensor, a control unit actuates a rod of a hood lifting/retaining mechanism to ascend to cause a flexible link mechanism to extend or stretch out to thereby lift a rear end of the hood so that a gap is provided between the hood and the engine room.

In the proposed vehicle hood apparatus, the rod has a hook for preventing downward movement of the rod upon arrival of the rod at its elevated or lifted position. The hook is rotatably attached to the rod by means of a support pin and is urged to extend outwardly from the rod by a compression spring. When the rod is elevated to its lifted position, the hook projects outwardly to lockingly engage with a vehicle body to thereby inhibit downward movement of the rod.

For retaining the hood at its lifted position, the vehicle hood apparatus has a complex hook-locking mechanism comprised of the compression spring and the hook, as explained above, which mechanism may be provided on the rod or built in the vehicle body. However, the hook-locking mechanism built in the rod makes the overall arrangement of the hood lifting/retaining mechanism complex and undesirably large in size. Further, the arrangement in which the hook-locking mechanism is built in the vehicle body requires due care to be taken for securely hook-locking the rod when the rod, which moves at an extremely high speed, is elevated a predetermined amount.

SUMMARY OF THE INVENTION

It is therefore an object of the present invention to provide a vehicle hood apparatus which is simple in construction but can reliably keep retaining a vehicle hood at its lifted position.

According to an aspect of the present invention, there is provided a vehicle hood apparatus for, when a vehicle collided with an obstacle, lifting a hood at a frontal part of the vehicle a predetermined amount and retaining the hood at a lifted position by means of a hood-retaining mechanism, the hood-retaining mechanism comprising: a lower link having one end swingably connected to a body frame of the vehicle; an upper link having one end swingably connected to the hood; a hinged portion for pivotally connecting opposite ends of the lower and upper links with each other and being offset toward a back of the vehicle from a linear line passing over the one ends of the lower and upper links when the hood is lifted the predetermined amount; and stopper means for restricting bending of the lower and upper links so that the hinged portion does not move further from the offset position toward the back of the vehicle.

It is preferred that the hinged portion is designed to be offset such that it projects beyond longitudinal central axes of the upper and lower links toward the back of the vehicle.

Desirably, the stopper means comprises a lower link stopper provided projectingly at the one end of the lower link for releasably engaging with the body frame, and an upper link stopper provided projectingly at the opposite end of the upper link for releasably engaging with the opposite end of the lower link.

In a normal state in which the rear and of the hood is lowered, the flexible link composed of the lower and upper links is folded so that the hinged portion is positioned toward a front of the vehicle. At this time, the flexible link is held at a full-close angle. As the hood rear end is lifted higher, the flexible link opens wider about the hinged portion and moves toward the back of the vehicle. When the hood is lifted the predetermined amount, the flexible link is brought into a full-open state and inhibited from further opening by the lower and upper link stoppers. That is, although an operational force resulted from the weight of the hood is applied to the hinged portion in a direction toward the back of the vehicle when the lower and upper links are brought into an upright state, this upright state can be maintained owing to the stoppers. Thus, the lifted hood can be stably held in that state by the hood-retaining mechanism. Consequently, it is no longer necessary to separately provide on hood-retaining means a mechanism for retaining the lifted hood at that position.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
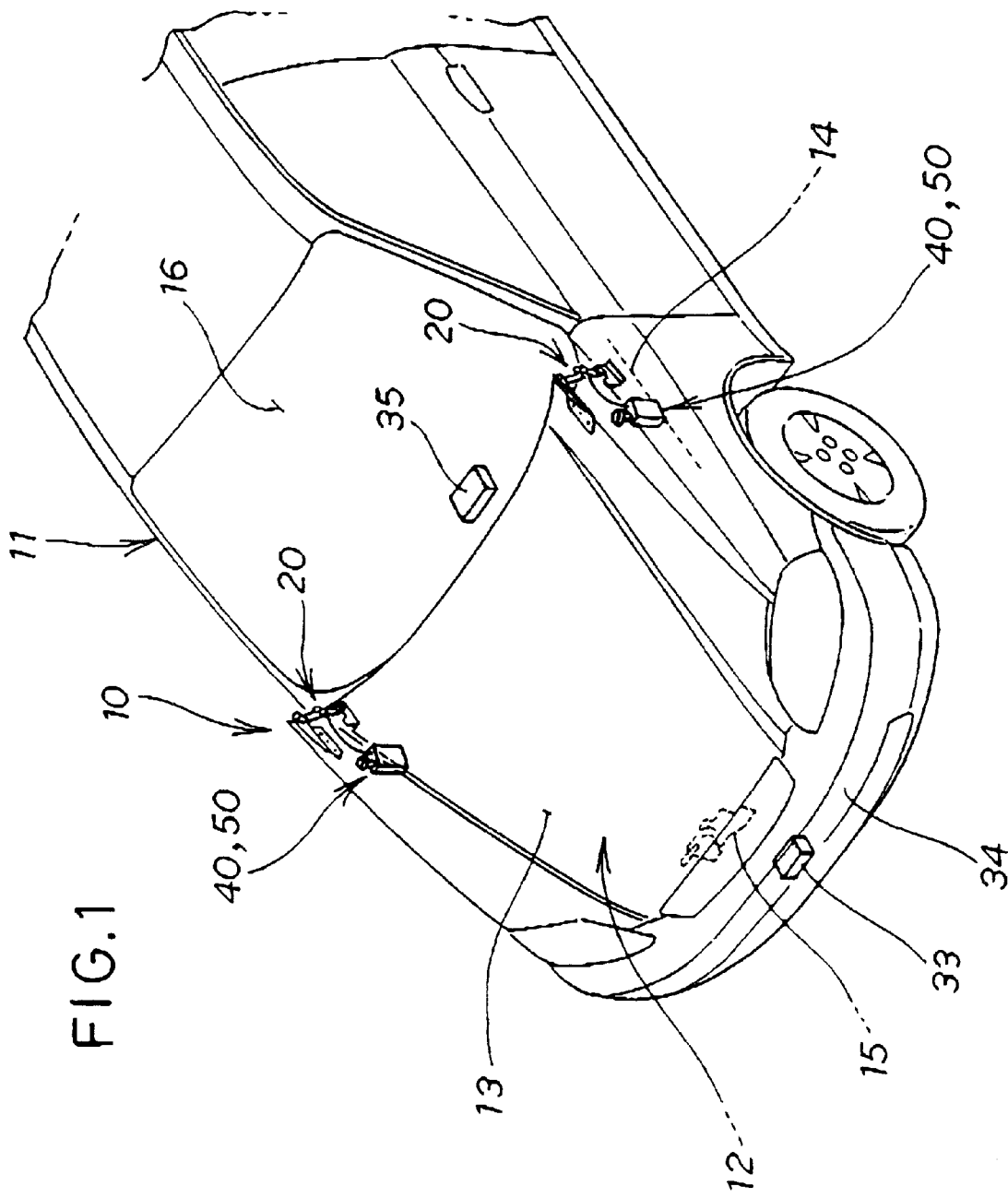
FIG. 1 is a partial schematic perspective view illustrating a vehicle employing a hood apparatus according to the present invention.
Figure 2:
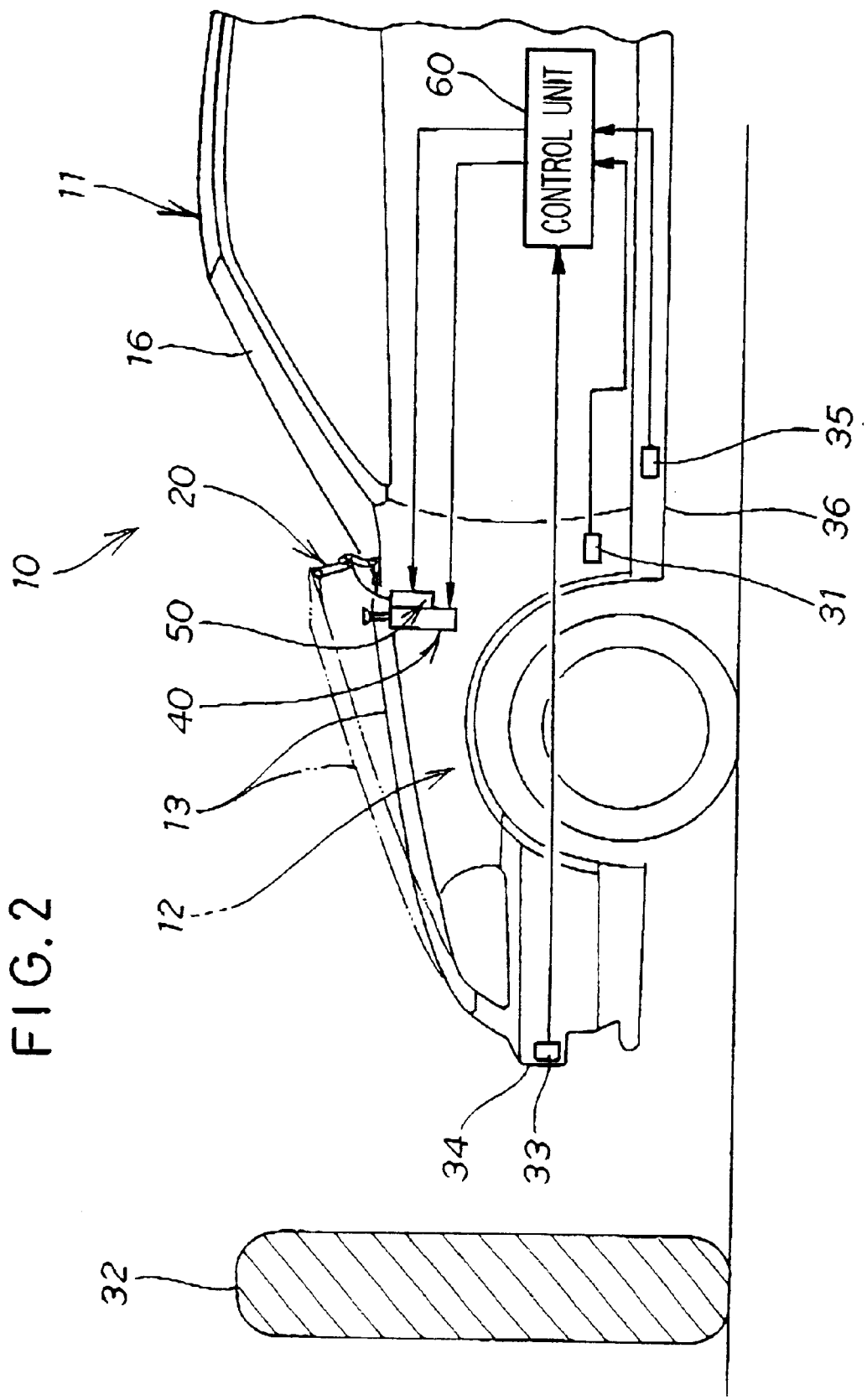
FIG. 2 is a side elevational view illustrating the vehicle of FIG. 1.

As shown in FIGS. 1 and 2, a vehicle 11 has an engine room or compartment 12 with an opening covered by a hood 13. Rear end of the hood 13 is secured to a vehicle body frame 14 by means of right and left retaining mechanisms 20, 20 disposed on the body frame 14 such that it can make opening and closing actions. Front part of the hood 13 is normally locked to the body frame 14 through a hood lock 15. Reference numeral 16 designates a windshield.

Hood apparatus 10 comprises the right and left hood-retaining mechanisms 20, 20, a vehicle velocity sensor 31 for detecting a vehicle velocity, bumper and floor sensors 33, 35, right and left hood-lifting actuators 40, right and left hood-returning actuators 50 and a control unit 60. The bumper sensor 33 is secured to a front bumper 34 of the vehicle 11. The floor sensor 35 is secured to a floor 36 of the vehicle 11. When the vehicle 11 collides with a forward obstacle 32, those sensors 33, 35 detect the collision and output corresponding signals. Each sensor 33, 35 comprises an acceleration sensor. The hood-lifting actuators 40 upwardly lift a rear end of the closed hood 13 when the vehicle hit an obstacle. The hood-returning actuators 50 return the lifted end of the hood 13 to its original position. The control unit 60 controls the hood-lifting actuators 40 and the hood-returning actuators 50 on the basis of signals output from the vehicle velocity sensor 31, bumper sensor 33 and floor sensor 35. The control unit 60 consists chiefly of a microcomputer. The present invention may include only the vehicle velocity sensor 33 instead of both the vehicle velocity sensor 33 and the floor sensor 35.

Figure 3:
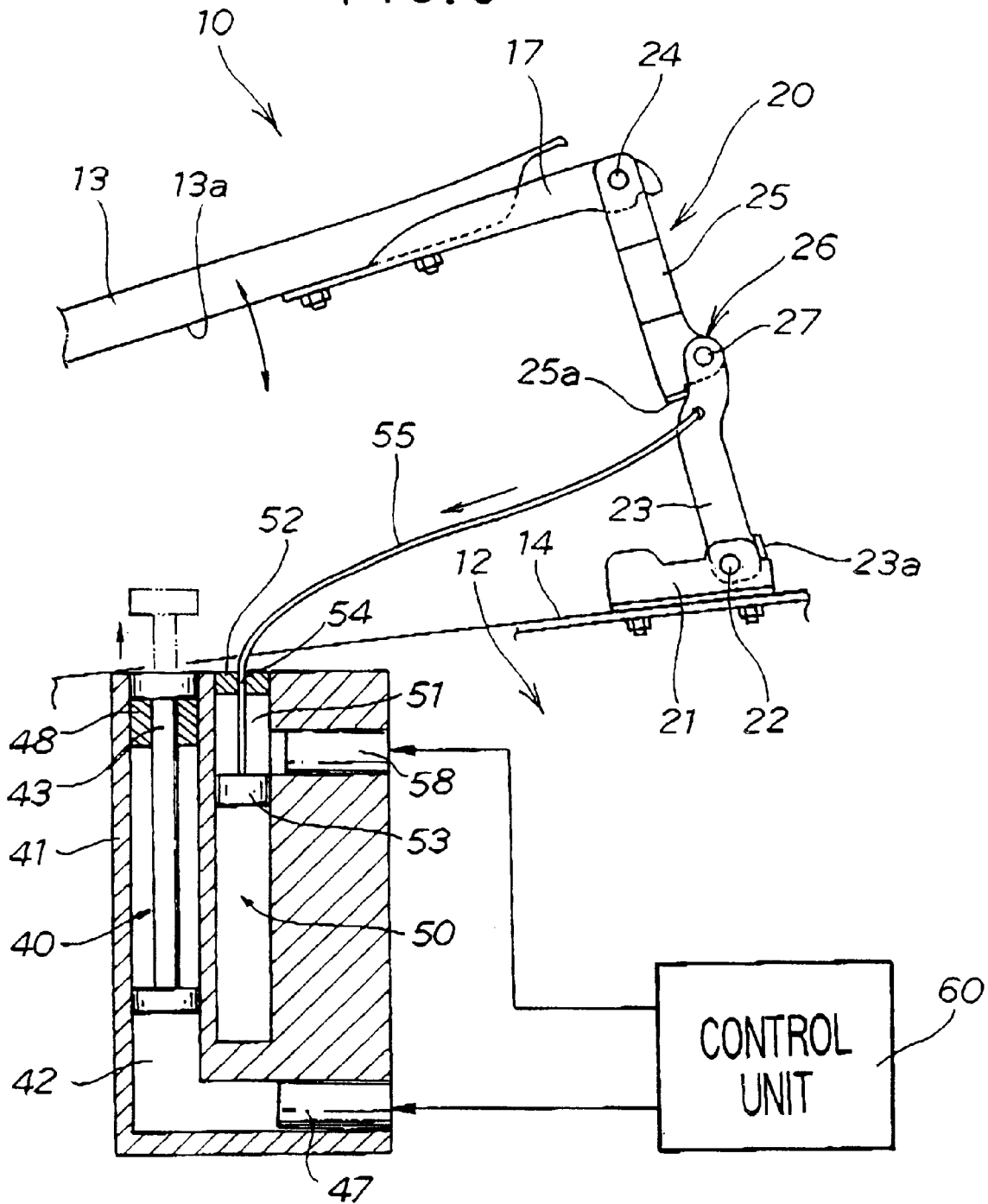
FIG. 3 is a schematic view showing, partially in section, the general arrangement of the hood apparatus of FIG. 2.

Reference is made next to FIG. 3 wherein the hood 13 is shown with its rear end lifted. The hood 13 includes a swing arm 17 extending backwardly. Each hood-retaining mechanism 20 includes a bracket 21 bolt-fastened to the vehicle body frame 14. Lower link 23 has one end pivotally connected to the bracket 21 by means of a first pin 22. Upper link 25 has one end pivotally connected to the swing arm 17 by means of a second pin 24. Opposite ends of the lower and upper links 23, 25 are rotatably connected with each other by means of a third pin 27 at a hinged portion 26.

Both the right hood-lifting actuator 40 and right hood-returning actuator 50 are housed in a right single housing 41 connected to the body frame 14. Similarly, both the left hood-lifting actuator 40 and left hood-returning actuator 50 are housed in a left single housing 41 connected to the body frame 14.

Each hood-lifting actuator 40 comprises a cylinder 42 formed in the housing 41 and opened upwardly, a piston 43 fitted reciprocally movable in the cylinder 42, a lifting inflator 47, and a stopper 48.

Each hood-returning actuator 50 comprises a cylinder 51 formed in the housing 41 and opened upwardly, a seal 52 for sealing an upper part of the cylinder 51, a piston 53 fitted reciprocally movably in the cylinder 51, a returning wire 55 extending outwardly through a hole 54 of the seal 52 and a returning inflator 58. Top end of the returning wire 55 extending outwardly from the seal 52 is connected to the lower link 23 proximately to its opposite end.

When fed with an electrical signal from the control unit 60, the lifting and returning inflators 47. 58 ignite a gas generating agent by means of an ignition device, not shown, to thereby generate a large quantity of gas. The generated gas is fed into the cylinders 42, 51. The cylinders 42, 51 are pressurized by the fed gas temporarily. As a result, the lifting piston 43 ascends while the returning piston 53 descends. Although not shown, the cylinders 42, 51 have an orifice of small diameter so that their internal pressures decline after lapse of a short period of time.

As the lifting inflator 47 is fed with a control signal (hood-lift signal), the piston 43 of the hood-lifting actuator 40 ascends a predetermined stroke since the pressure within the cylinder 42 rises temporarily. Thereafter, the piston 43 descends to its original position in correspondence with the fall of the internal pressure of the cylinder 42.

In contrast, as the returning inflator 58 is fed with a control signal (hood-return signal), the piston 53 of the hood-returning actuator 50 descends a predetermined stroke since the internal pressure of the cylinder 51 rises temporarily. By the descending movement of the piston 53, the returning wire 55 is pulled down to move the upper part of the lower link 23 forwardly, whereby the lower link 23 pivots or swings forwardly about the first pin 22.

Discussion will be made next as to the control of the control unit 60 with reference to FIGS. 2 and 4.

STEP (hereinafter simply "ST") 01: Determination is made as to whether vehicle speed Vc detected by the vehicle velocity sensor 31 is higher than a reference speed Vo (e.g., higher than 20–30 km/hr). When the detected vehicle speed Vc is higher than the reference speed Vo, the control proceeds to ST 02. When the detected vehicle speed Vc is lower than the reference speed Vo, the control returns to ST 01.

ST 02: Determination is made as to whether the bumper sensor 33 is ON, that is, it is fed with a detected signal from the bumper sensor 33. When the bumper sensor 33 is ON, the control proceeds to ST 03. When the bumper sensor 33 is OFF, the control returns to ST ST 01.

ST 03: Determination Is made as to whether the floor sensor 35 is ON, that is, it is fed with a detected signal from the floor sensor 35. When the floor sensor 35 is ON, the control proceeds to ST 04. When the floor sensor 35 is OFF, the control returns to ST 01. The floor sensor 35 outputs a detected signal when, for example, it detects acceleration lower than a preset, predetermined value of acceleration. Accordingly, in ST 03, the obstacle 32 hit by the vehicle 11 is determined to be a light-weight obstacle as the floor sensor 35 is ON.

As can be appreciated from the above discussion, only when all determinations in ST 01 to ST 03 are YES, it is determined that the vehicle 11 has collided with an obstacle 32 weighing less than a predetermined weight. When the vehicle hood apparatus 10 is not provided, ST 03 is not required.

ST 04; When all determinations in ST 01–ST 03 are YES, the control unit 60 outputs a hood lift signal. The hood-lifting actuator 40 is actuated in response to the hood lift signal ON.

ST 05: Timer gets started. Then, the control proceeds to ST 06.

ST 06: Determination is made as to whether the timer's counted time Tc is longer than a reference time To (e.g., 0.1–0.5 sec.). When it is YES, the control proceeds to ST 07. When it is NO, ST 06 Is repeated.

ST 07: The hood return signal Is put ON to thereby complete the control. Based on the hood return signal ON corresponding to the predetermined lapse time from the timer, the hood-returning actuator 50 is actuated to return the hood 13 to its original position.

As is apparent from the above discussion, ST 01–ST 03 are dedicated to determine the collision of the vehicle 11 with the obstacle 32 while ST 05–ST 06 are dedicated to time a predetermined time lapsed from the lift of the hood 13.

Figure 5:
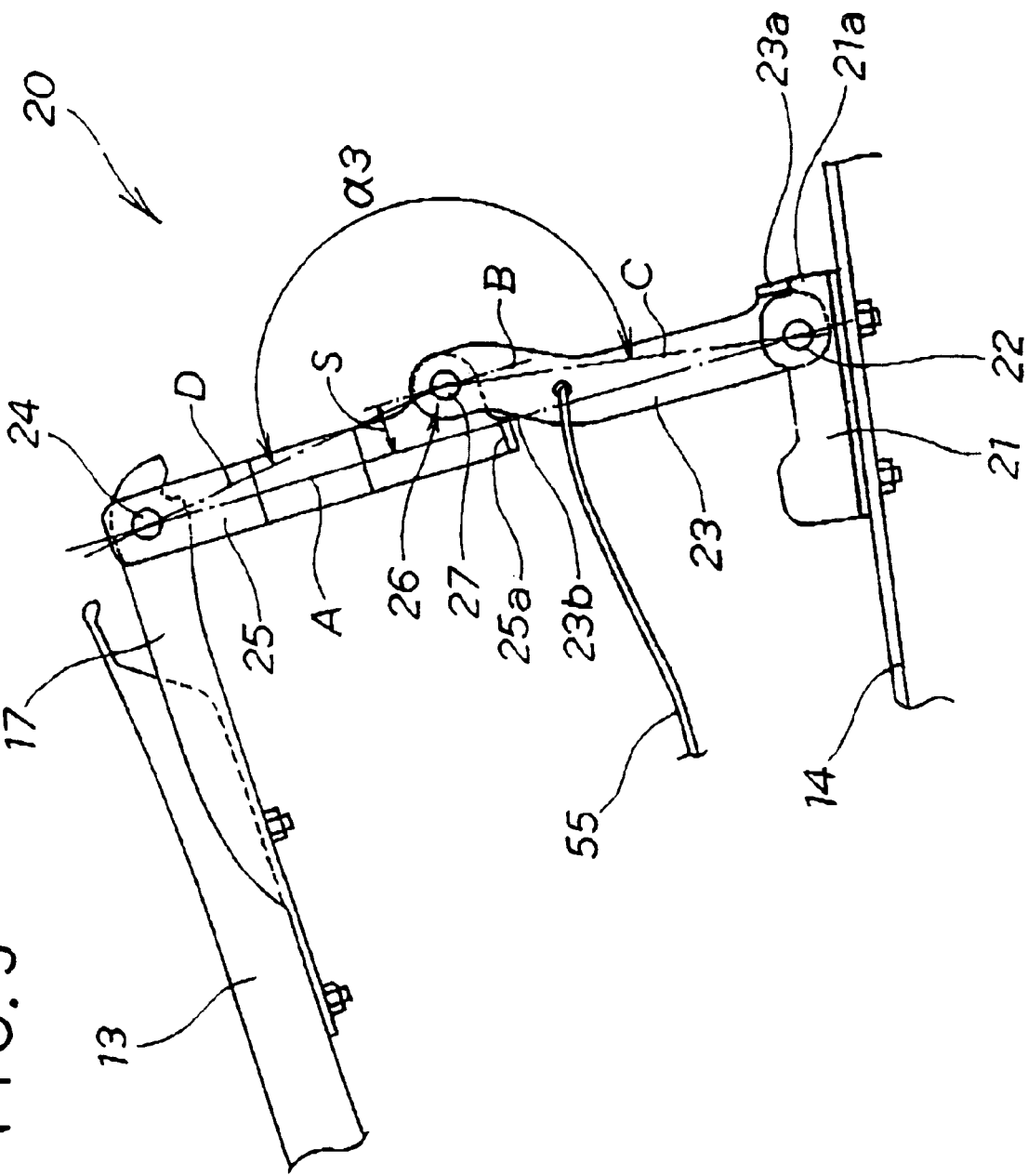
FIG. 5 is a schematic view illustrating a hood-retaining mechanism shown in FIG. 3.

Reference is made next to FIG. 5 illustrating one hood-retaining mechanism 20. The retaining mechanism 20 is provided to keep the lifted rear part or tail of the hood 13 in its lift position. With the hood tail lifted, that is, with the upper and lower links 25, 23 extended linearly, the hinged portion 26 is arranged to become offset a distance S in a direction toward the back of the vehicle (rightwardly in the Figure) rather than to connect the upper and lower links 25, 23 to extend linearly. More specifically, line B passing over the center of the third pin 27 of the hinged portion 26 is offset a distance S in a direction toward the back of the vehicle from a straight line A passing over the center of the first pin 22 of the lower link 23 and the center of the second pin 24 of the upper link 25. With the thus-offset hinged portion 26, the hood-retaining mechanism 20 can flex in correspondence with the vertical movement of the hood 13.

The flexible hood-retaining mechanism 20 comprises an upper link stopper 25a for restricting the opening of the upper and lower links 25, 23 beyond a full-open angle 3 wherein the links 25, 23 lie linearly, and a lower link stopper 23a. More specifically, the lower link 23 has the lower link stopper 23a formed integrally therewith and projecting from a lower rear part thereof for engagement with and disengagement from the bracket 21, while the upper link 25 has the upper link stopper 25a formed integrally therewith and projecting from a lower frontal part thereof for locking engagement with the stretched or extended lower link 23.

By abutment of the lower link stopper 23a against a rear upper end 21a of the bracket 21, the lower link 23 is prevented from further backward rotation about the first pin 22. By abutment of the upper link stopper 25a against an upper frontal end 23b of the lower link 23, the upper link 25 is prevented from further backward rotation about the second pin 24. The full-open angle 3 is maintained in this manner.

Operation of the hood-retaining mechanism 20 will now be described with reference to FIGS. 6 to 9.

Figure 6:
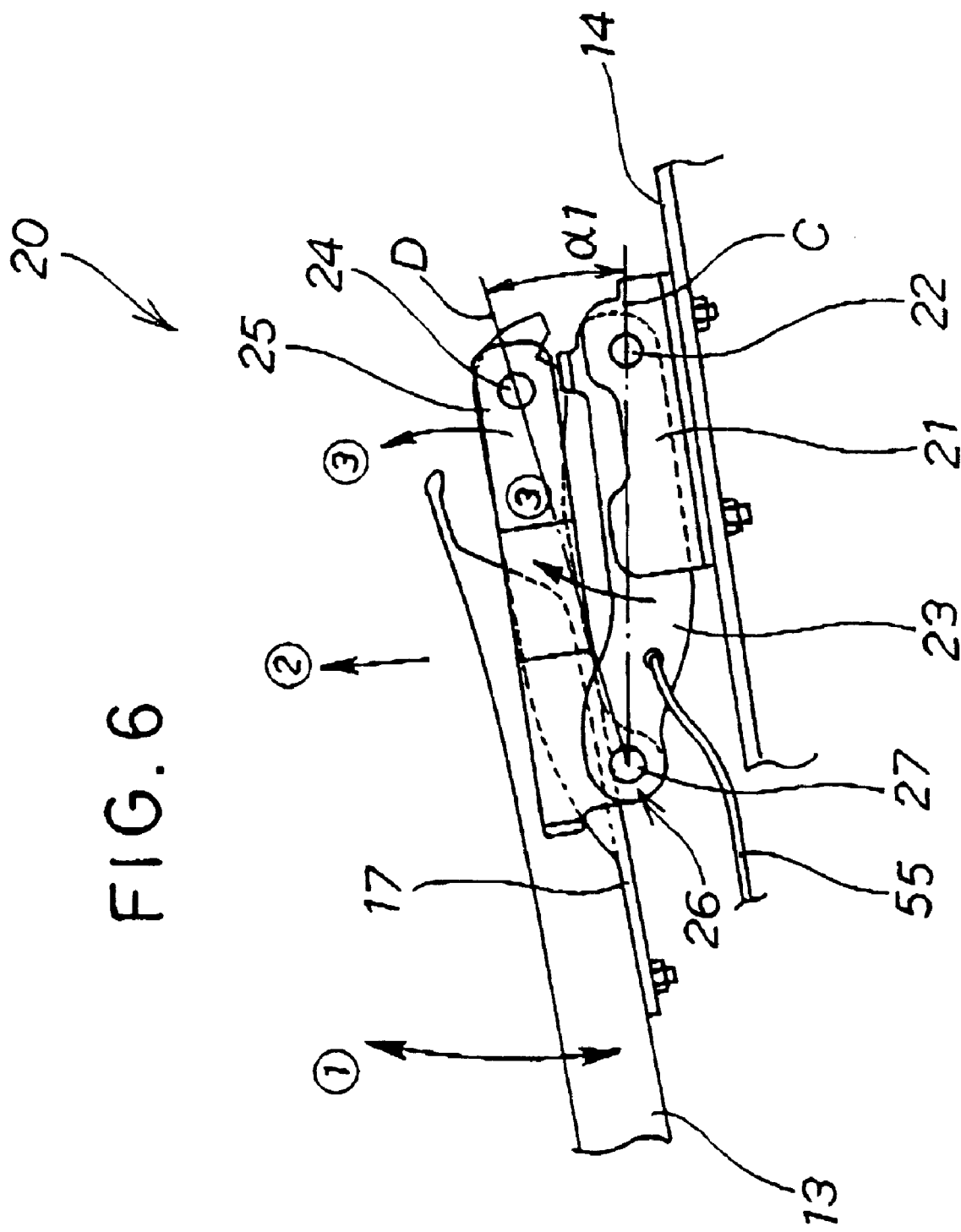
FIG. 6 is a view illustrating a normal state in which a flexible link forming the hood-retaining mechanism is folded to keep the hood at its lowermost position to thereby close the engine room.

In FIG. 6, the hood 13 is placed in its normal position in which the engine room is closed. At this time, the retaining mechanism 20 is held in a folded state with the hinged portion 26 positioned forwardly of the first and second pins 22, 24.

Straight line C passes over the centers of the first and third pins 22, 27 while another straight line D passes over the centers of the second and third pins 24, 27. The straight lines C and D intersect with each other at the center of the third pin 27 to provide an angle 1 therebetween. The angle 1 is acute and formed as the upper and lower links 25, 23 are placed in a fully folded state.

As shown by arrow (1), the hood 13 is rotatable vertically about the second pin 24. When the rear end of the hood 13 is lifted or moved in a direction of arrow (2) with the front part of the hood 13 locked to the vehicle body frame, the upper link 25 starts a swinging movement about the third pin 27 while the lower link 23 starts a swinging movement in a direction of arrow (3) about the first pin 22.

Figure 7:
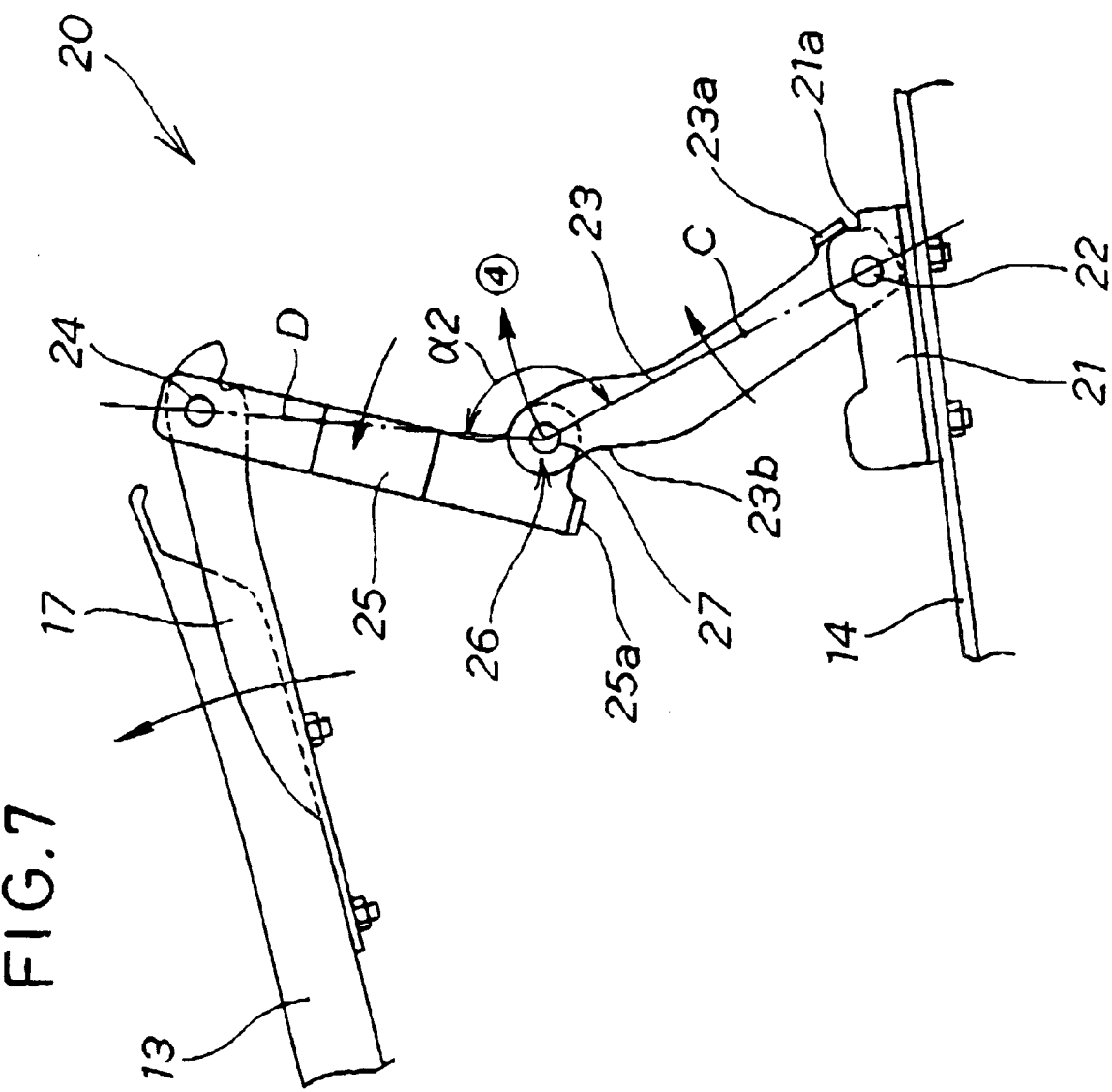
FIG. 7 illustrates an operation of the hood-retaining mechanism with its flexible link opened halfway and the hood lifted from the position of FIG. 6.

Turning now to FIG. 7, the hood 13 is shown with its tail end lifted. Since the upper and lower links 25, 23 make swinging movements, the third pin 27 moves toward the back of the vehicle (rightward in the Figure), as shown by arrow (4). An angle formed at this time by the straight lines C and D is 2. This angle 2 is obtuse and larger than the full-close angle 1 shown in FIG. 6. That is, the flexible link formed by the lower and upper links 23, 25 open wider with the amount of lift of the hood 13.

Figure 8:
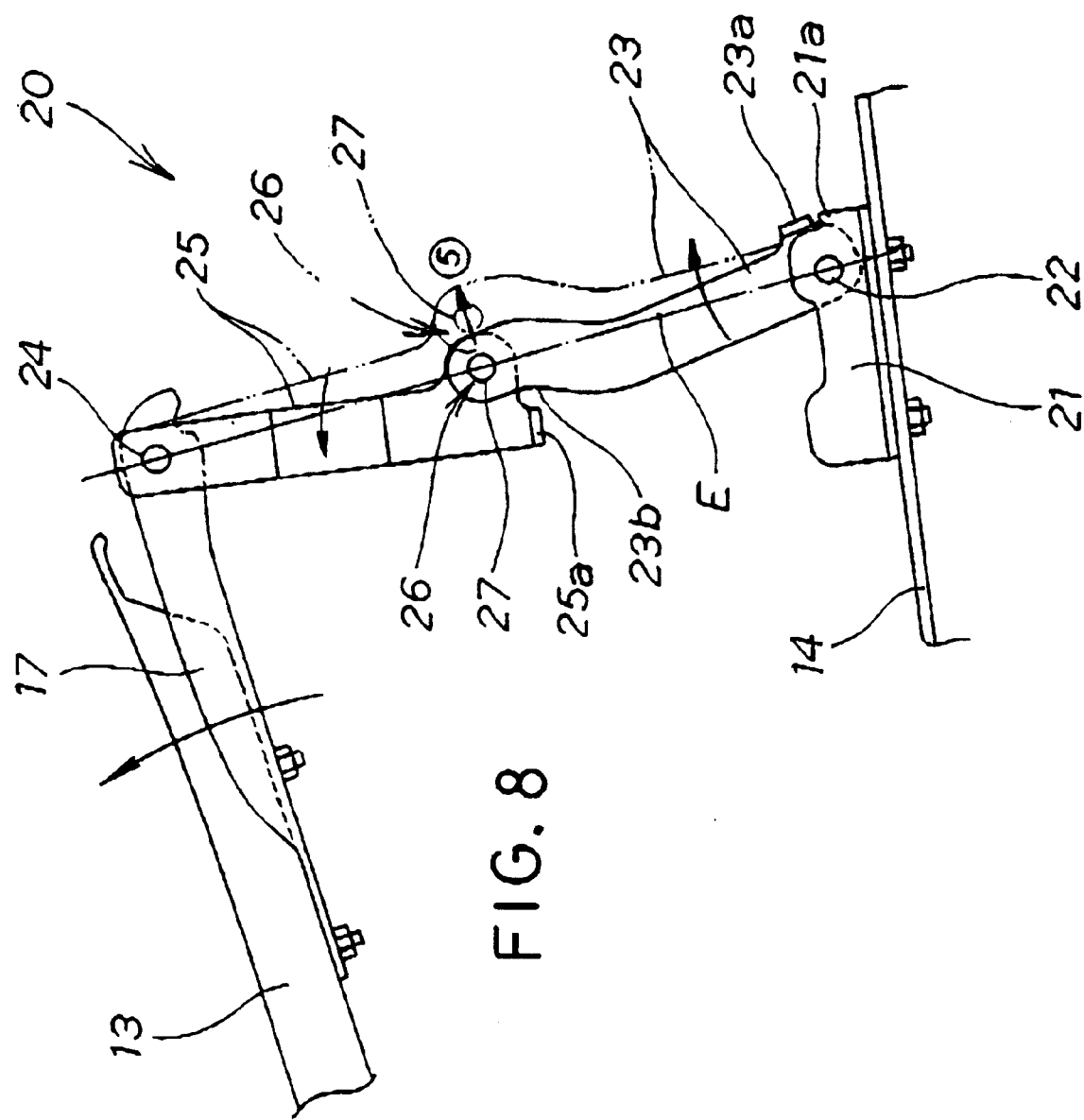
FIG. 8 illustrates an operation of the hood-retaining mechanism with its flexible link opened wider and the hood lifted higher.

In FIG. 8, the rear end of hood 13 is lifted higher than in FIG. 7 so that the first pin 22, second pin 24 and third pin 27 all lie on a straight line E. As the hood 13 pops up, inertia is produced. This inertia causes the third pin 27 to move toward the back of the vehicle, that is, in a direction of arrow (5), as shown by a double-dot-and-dash line, away from the straight line E. In other words, the hinged portion 26, which is positioned toward the front of the vehicle as the hood is closed and the flexible link forming the hood-retaining mechanism 20 is folded, is moved toward the back of the vehicle, thereby gradually lifting the hood 13 and bringing the flexible link into an upright state.

When the third pin 27 is moved away from the straight line E toward the back of the vehicle, the lower link stopper 23a abuts against rear upper end 21a of the bracket 21 while the upper link stopper 25a abuts against the upper front end 23b of the lower link 23. The flexible link consisting of the lower and upper links 23, 25 of the hood-retaining mechanism 20 stands upright linearly and maintains its upright position. Angle formed at this time by the straight lines C and D is 3. This angle 3 is provided when the flexible link is fully open. It is larger than the angle 2 of FIG. 7 and exceeds 180°. The tail end of the hood 13 is lifted to its maximum position. When the hood 13 is thus lifted the predetermined amount, the flexible link is kept at the upright, full-open angle 3 by the lower link stopper 23a and upper link stopper 25a and does not open wider than the full-open angle.

As is apparent from the above discussion, the angle of the flexible link varies from the full-close angle 1 of FIG. 6 in which the hood 13 is lowered, to the full-open angle 3 of FIG. 5 in which the hood 13 is lifted.

Figure 9:
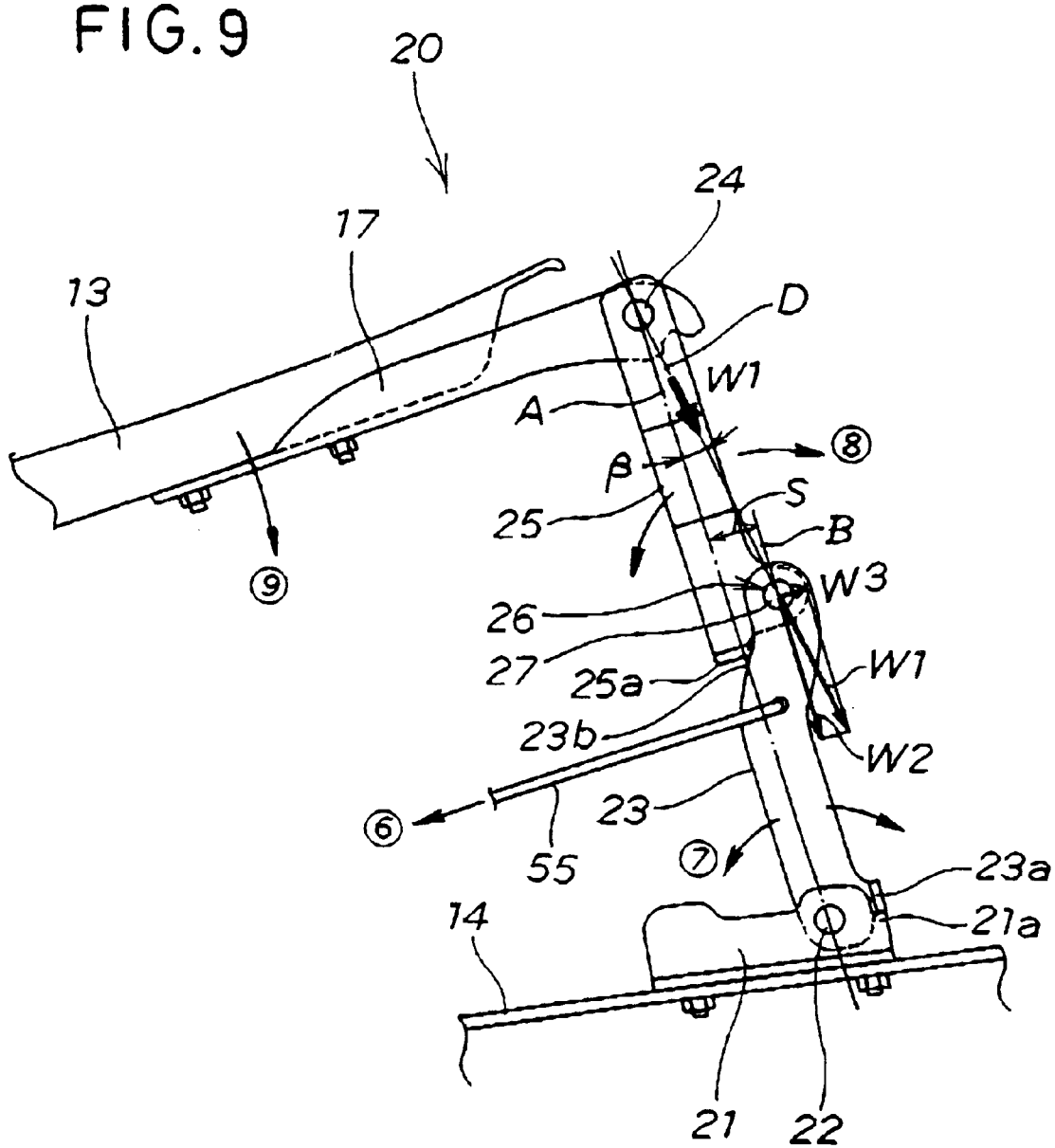
FIG. 9 illustrates an operation of the hood-retaining mechanism as the hood is lifted a predetermined amount.

Referring to FIG. 9, discussion will be made next as to an operation of the hood-retaining mechanism 20 as the rear end of the hood 13 is lifted a predetermined amount, particularly as to an operational force applied to the third pin 27.

Since the lower link stopper 23a abuts against the bracket 21 as the rear end of the hood 13 is lifted a predetermined amount, the lower link 23 cannot rotate clockwise about the first pin 22. Since the upper link stopper 25a abuts against the lower link 23, the upper link stopper 25 cannot rotate counterclockwise about the third pin 27. With the front part of the hood 13 locked to the vehicle body frame 14 by means of the hood lock 15 (see FIG. 1), the hood 13 cannot move back and forth. Consequently, the upper link 25 cannot rotate clockwise about the third pin 27, either.

As the lower and upper links 23, 25 are held in an upright state, the hinged portion 26 is displaced toward the back of the vehicle from the straight line A passing over the centers of the first and second pins 22, 24. Consequently, the straight line D passing over the centers of the second and third pins 24, 27 lies inclined an angle relative to the straight line A.

When a downward load W1 along the straight line D is applied from the hood 13 to the second pin 24, the load W1 is also applied to the third pin 27. The load W1 applied to the third pin 27 branches into a downward partial load W2 and a sideways or backward partial load W3 in correspondence with the angle The partial load W3 provides a force for rotating the lower link 23 clockwise about the first pin 23. However, the lower link 23 cannot rotate because the stopper 23a is held in locking engagement with the bracket 21 as mentioned above.

As can be readily appreciated, when the rear end of the hood 13 is lifted a predetermined amount, the weight of the hood 13 is normally applied to the hinged portion 26 to thereby urge the hinged portion backwardly of the vehicle. Thus, the lower link 23 and the upper link 25 do not fold forwardly about the hinged portion 26, whereby the flexible link is maintained in its upright position. Consequently, the lift position of the hood 13 can be fixedly retained by the hood-retaining mechanism 20. This makes it unnecessary to provide the hood-lifting actuator 40 (see FIG. 3) with a mechanism for retaining the lifted hood 13. It also becomes unnecessary to connect the hood-lifting actuator 40 to the hood 13 or the hood-retaining mechanism 20.

In the upright state of the hood-retaining mechanism 40, as the returning wire 55 is pulled toward the front of the vehicle as shown by arrow (6), the lower link 23 rotates counterclockwise about the first pin 22 as shown by arrow (7). The upper link 25 rotates clockwise about the third pin 27 as shown by arrow (8). Consequently, the hood-retaining mechanism 20 is gradually folded so that the rear end of the hood 13 is brought down, as shown by arrow (9), until it comes to its original position.

Operation of the thus-arranged hood apparatus 10 will be described below with reference to FIGS. 10 to 14.

Figure 10:
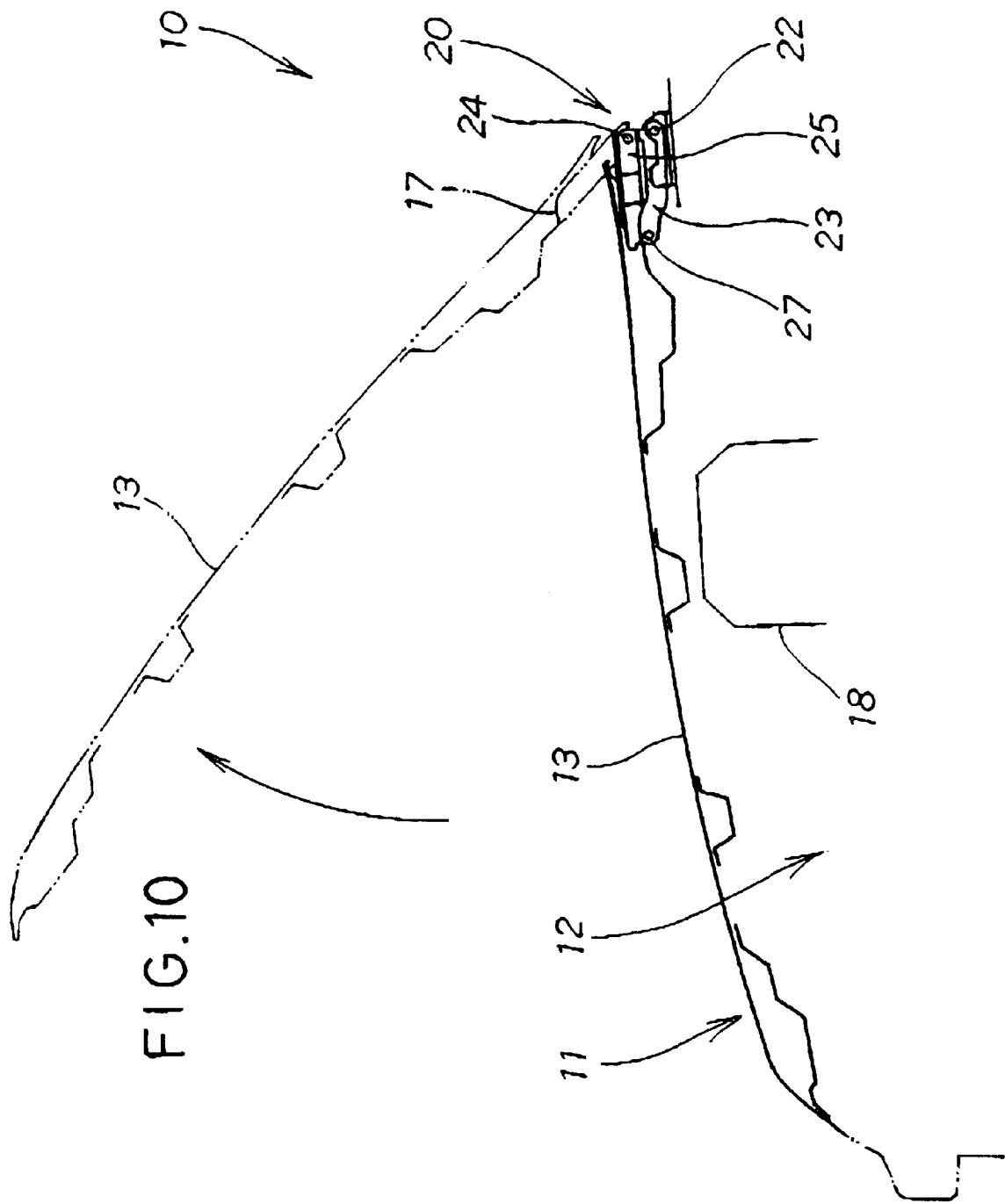
FIG. 10 is a schematic side view illustrating a normal state in which the hood is lowered to its initial position to close the engine room.

In FIG. 10, the hood 13 is shown lowered to cover the engine room 12 with the hood-retaining mechanism 20 folded. The hood 13 is rendered capable of opening and closing actions about the second pin 24. By opening the hood 13 as shown by a phantom line, maintenance and inspection can be performed with respect to equipment 18 housed in the engine room 12.

Figure 11:
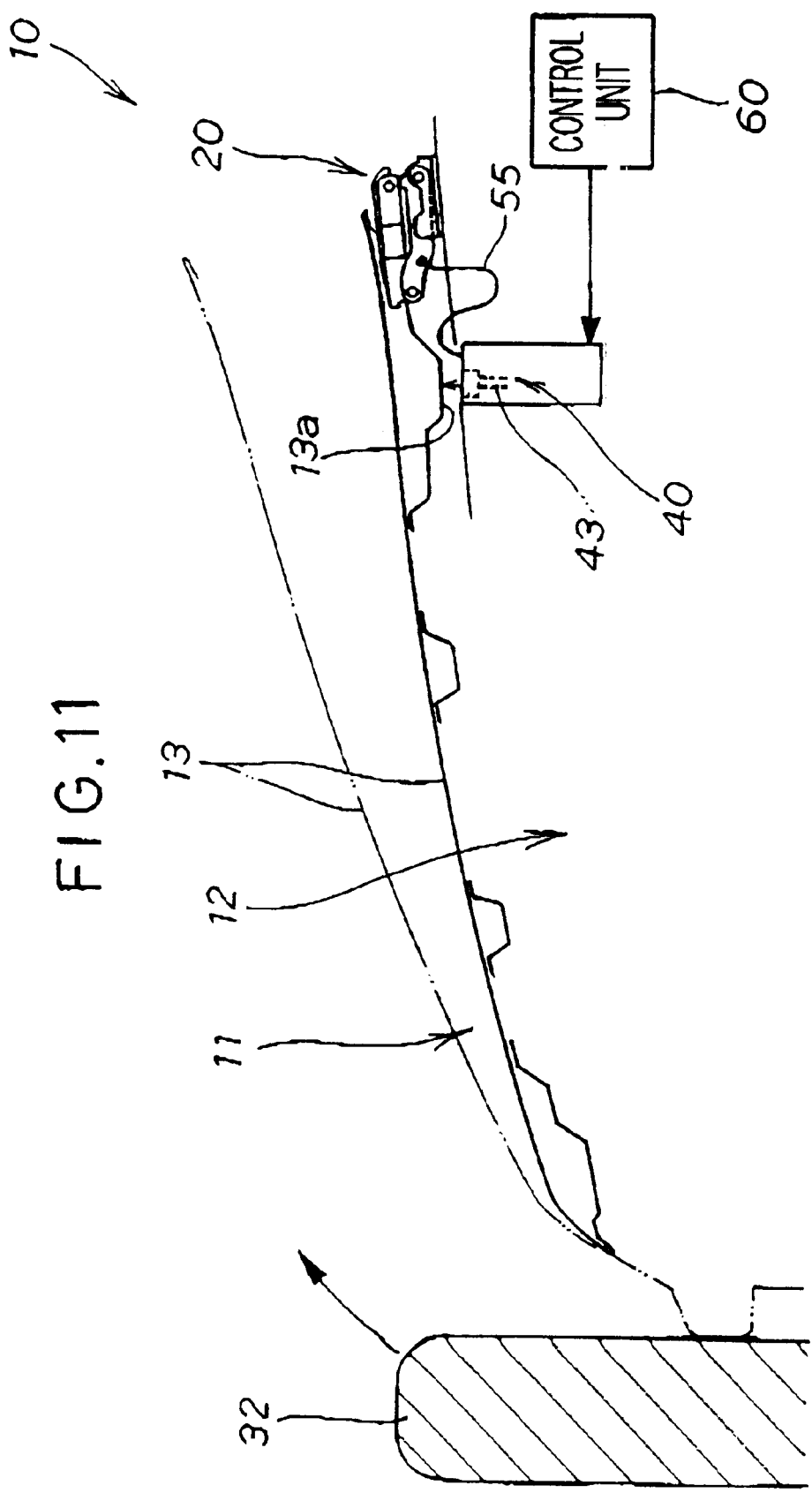
FIG. 11 illustrates an operation of the hood apparatus upon collision of the vehicle with an obstacle.

Referring to FIG. 11, the vehicle 11 is shown with the obstacle 32 hit thereby. When the vehicle 11 hits the obstacle 32 while running at a higher speed than a predetermined vehicle speed, the control unit 60 outputs a hood-lift signal. Based on this signal, the hood-lifting actuator 40 starts a lifting action such that the piston 43 pops up at a high speed to thrust an undersurface 13a of the rear end of the hood 13 upwardly.

Figure 12:
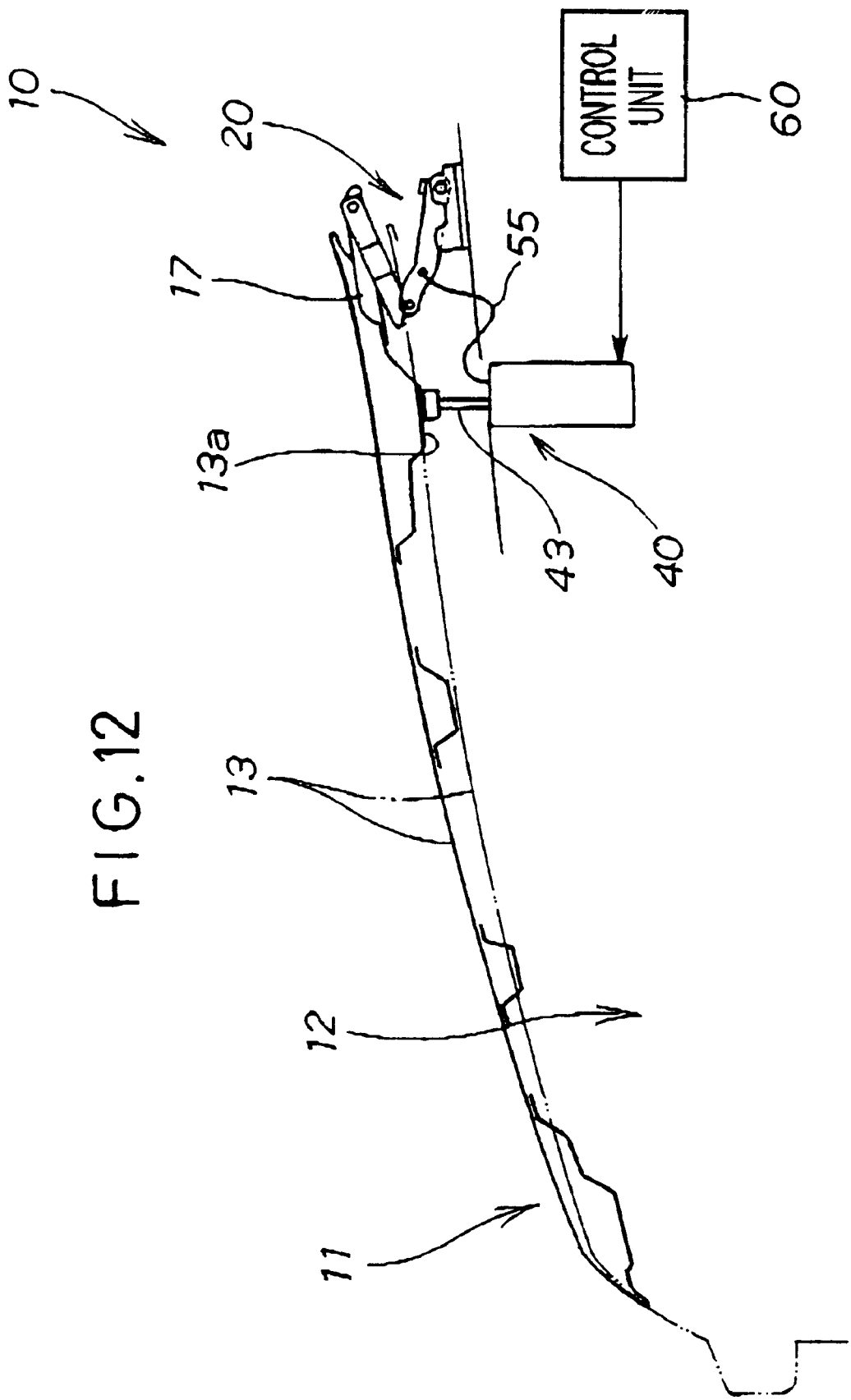
FIG. 12 illustrates an operation of a hood-lifting actuator upon collision of the vehicle with the obstacle, the actuator being actuated to cause a piston to thrust the hood upward.

By thus instantly pushing up the rear end of the hood 13 upwardly through the piston 43, the hood 13 is thrust up from the original or normal level shown by a phantom line to the level shown by a solid line, as shown in FIG. 12. The instantly thrust-up hood 13 is lifted higher by inertia. The hood-retaining mechanism 20 comes to stand upright as the rear end of the hood 13 rises higher.

Figure 13:
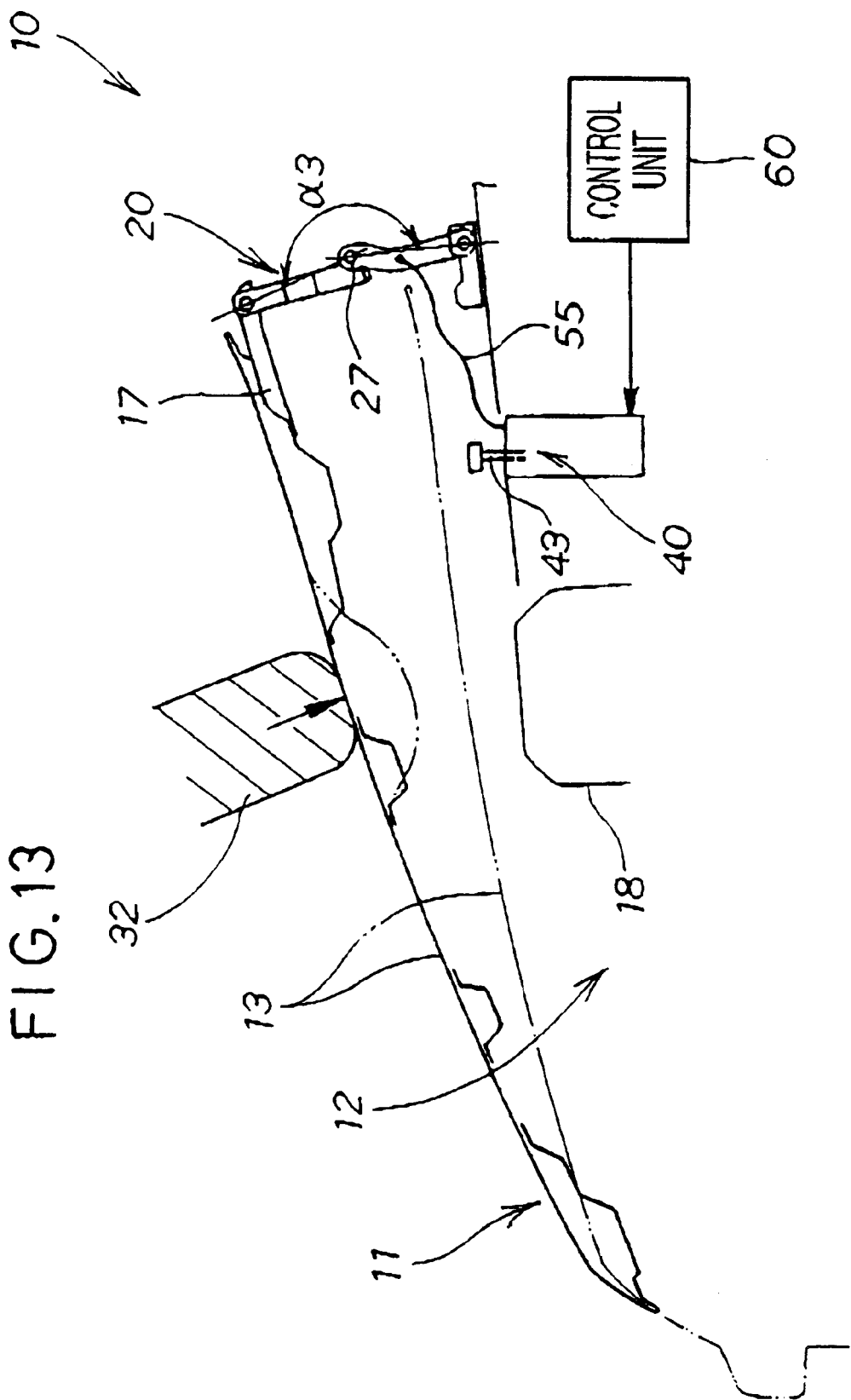
FIG. 13 is a schematic view illustrating the hood apparatus with its hood lifted and retained in that state by the hood-retaining mechanism.

In FIG. 13, the hood-retaining mechanism 20 is brought to form the full-open angle 3 and held in its upright position. The hood rear end does not rise any further and is retained by the hood-retaining mechanism 20 at a solid-lined position elevated a predetermined height (e.g., 100 to 200 mm) from the phantom-lined original position.

Predetermined space is defined between the predetermined-height-lifted hood 13 and the equipment 18 such as an engine housed in the engine room 12, thereby making the hood 13 deformable downwardly. Thus, when the obstacle 32 bumped against the hood 13, the lifted hood 13 can be deformed, as shown by a phantom line, to thereby sufficiently absorb an impact of the obstacle 32. This not only protects the equipment or engine 18 from the obstacle 32 but also reduces an impact applied to the obstacle 32.

Figure 14:
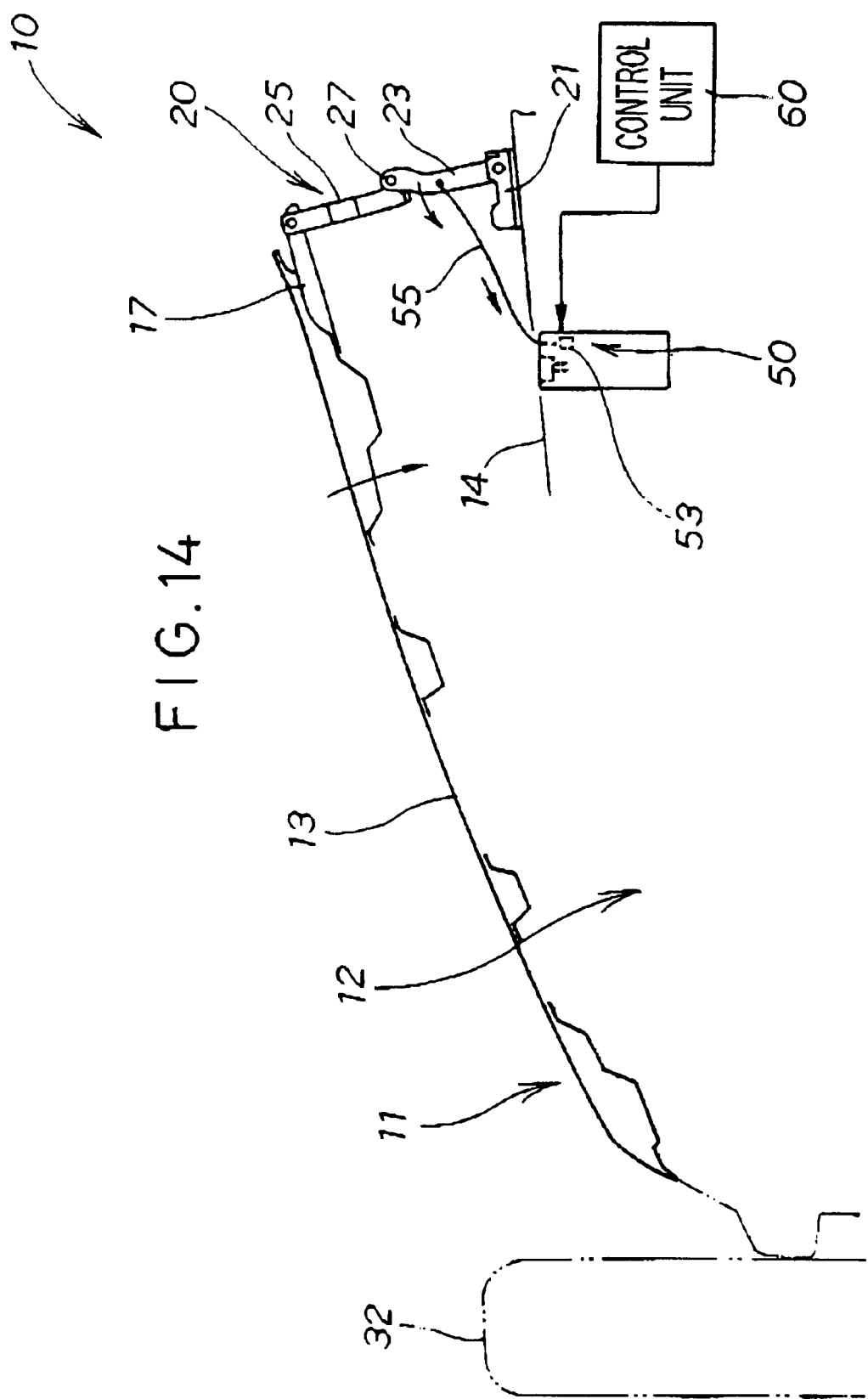
FIG. 14 is a schematic view illustrating an operation of the hood apparatus after lapse of a predetermined time from the collision of the vehicle with the obstacle, with the hood-returning actuator actuated and the flexible link being folded by the returning wire.

When the vehicle 11 collided with the obstacle 32, the hood 13 is brought into its lifted position as shown in FIG. 14. As a predetermined time has elapsed from the lift of the hood 13, the control unit 60 determines that the obstacle 32 will no longer bump onto the hood 13 and outputs a hood-return signal. Based on this signal, the hood-returning actuator 50 starts its returning action and instantly pulls in the returning wire 55. As a result, the hood-retaining mechanism 20 is folded to cause the hood 13 to be lowered until the latter comes to its original lowermost position.

Figure 15:
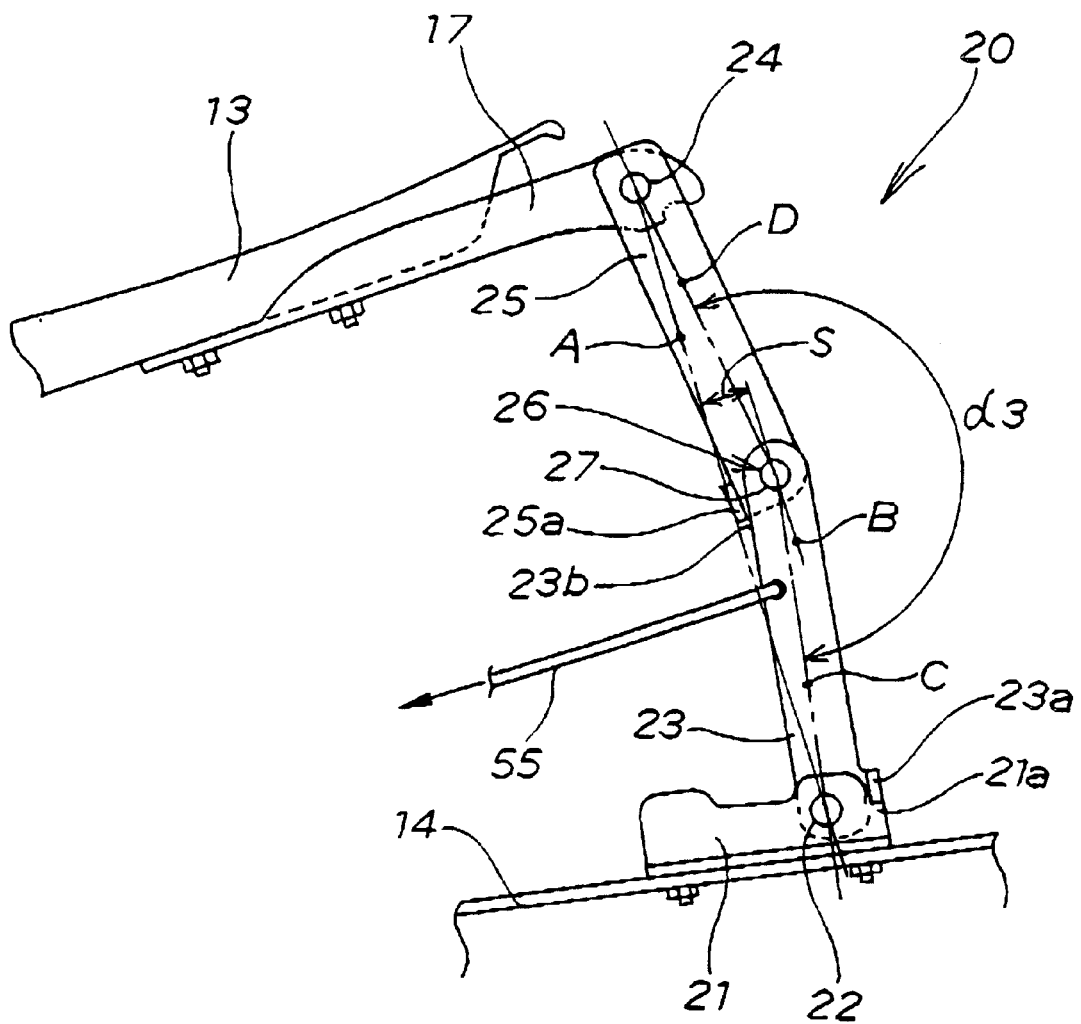
FIG. 15 is a schematic view illustrating an alteration of the hood-retaining mechanism of FIG. 5.

An altered form of the hood-retaining mechanism will now be discussed with reference to FIG. 15. Unlike the arrangement of FIG. 5 wherein the third pin 27 of the hinged portion 26 is displaced rearwardly of the vehicle from the longitudinal central axis of the lower and upper links 23, 25, the altered hood-retaining mechanism 20 is arranged such that the third pin 27 lies on that longitudinal central axis. The thus-arranged hood-retaining mechanism 20 can also operate similarly to the hood-retaining mechanism 20 employed in the embodiment of FIG. 5. That is, when the hood 13 is lifted sharply by the hood-lifting actuator 40 (see FIG. 3), the lower link 23 and the upper link 25 stand linearly to maximize the amount of lift of the hood 13. In contrast, an operational force applied to the third pin 27 is directed rearwardly of the vehicle to cause the lower and upper links 23, 25 to be folded rearwardly of the vehicle about the third pin 27. However, the lower link stopper 23a lockingly engage with the bracket 21 while the upper link stopper 25a lockingly engage with the lower link 23. This prevents the lower link 23 and upper link 25 from being folded further toward the back of the vehicle to thereby stably retain the hood 13 in its lifted position.

It may be readily appreciated by skilled artisans that the present invention should not be limited to the above-described embodiment. For example, the invention may be embodied such that the hood-retaining mechanism 20 is mounted directly to the hood 13 and the vehicle body frame 14, thereby omitting the swing arm 17 and the bracket 21.

Although the above embodiment has been described as having the hood-lifting and hood-returning actuators 40, 50 disposed on both sides of the vehicle, the present invention should not be construed as being limited thereto. An alternative arrangement may be possible. For example, only one of each of the actuators 40, 50 may be provided on the vehicle for effecting the lifting and returning of the hood 13.

The hood-lifting actuator 40 and the hood-returning actuator 50 may be provided separately instead of housing then in the single housing 41.

The timer for timing the predetermined time from the lift of the hood 13 may be built in the control unit 60 or disposed independently of the unit 60.

Figure 4:
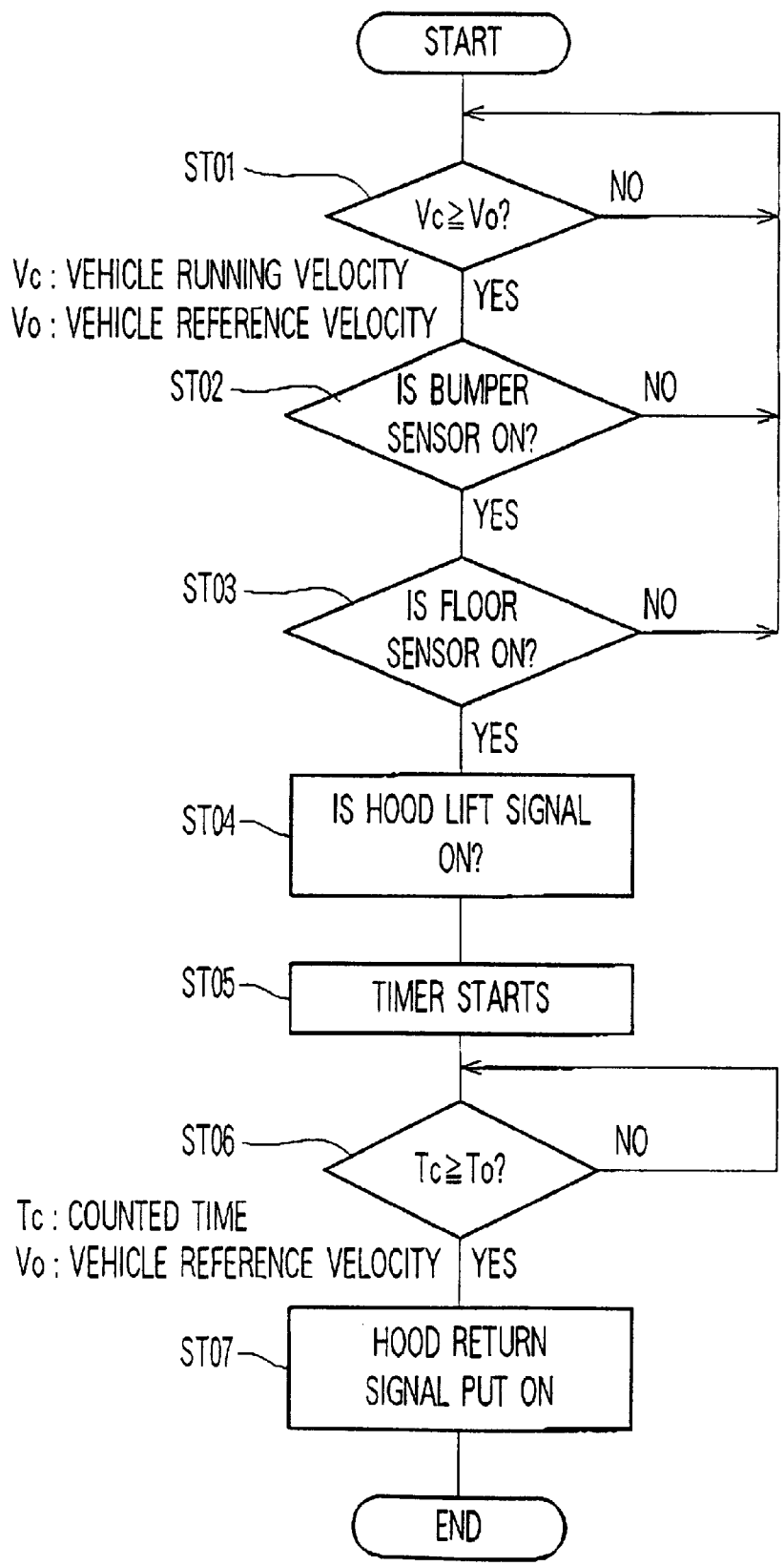
FIG. 4 is a flowchart showing the flow of control of a control unit of FIG. 3.

The reference time To used in ST 06 of FIG. 4, that is, the predetermined time from the time of lift of the hood 13 may be set optionally.

It may be possible to employ other stoppers for restricting the full-open angle 3 of the hood-retaining mechanism 20 than the lower link and upper link stoppers 23i a,25a. For example, the lower link stopper 23a may be on the bracket 21 of the vehicle such that it engages and disengages with respect to the lower link 23. Similarly, the upper link stopper 25a may be provided on the lower link 23 such that it engages and disengages with respect to the upper link 25.

Obviously, various minor changes and modifications of the present invention are possible in the light of the above teaching. It is therefore to be understood that within the scope of the appended claims the invention may be practiced otherwise than as specifically described.

What is claimed is:

1. A vehicle hood apparatus for, when a vehicle collides with an obstacle, lifting a hood at a frontal part of the vehicle a predetermined amount and retaining the hood at a lifted position by means of a hood-retaining mechanism, said hood-retaining mechanism comprising:

a lower link having one end swingably connected to a body frame of the vehicle;

an upper link having one end swingably connected to said hood;

a hinged portion for pivotally connecting opposite ends of said lower and upper links with each other and being offset toward a back of said vehicle from a linear line passing over said one ends of said lower and upper links when said hood is lifted the predetermined amount; and stopper means for restricting bending of said lower and upper links so that said hinged portion does not move further from the offset position toward the back of said vehicle.

2. A vehicle hood apparatus according to claim 1, wherein said hinged portion is designed to be offset such that it projects beyond longitudinal central axes of said upper and lower links toward the back of said vehicle.

3. A vehicle hood apparatus according to claim 1, wherein said stopper means comprises a lower link stopper provided projectingly at said one end of said lower link for releasably engaging with said body frame, and an upper link stopper provided projectingly at said opposite end of said upper link for releasably engaging with said opposite end of said lower link.

\* \* \* \* \*